J. B. McGRORY.
ADJUSTABLE FLEXIBLE BELT FASTENER.
APPLICATION FILED DEC. 19, 1919.
1,355,766.                                                  Patented Oct. 12, 1920.
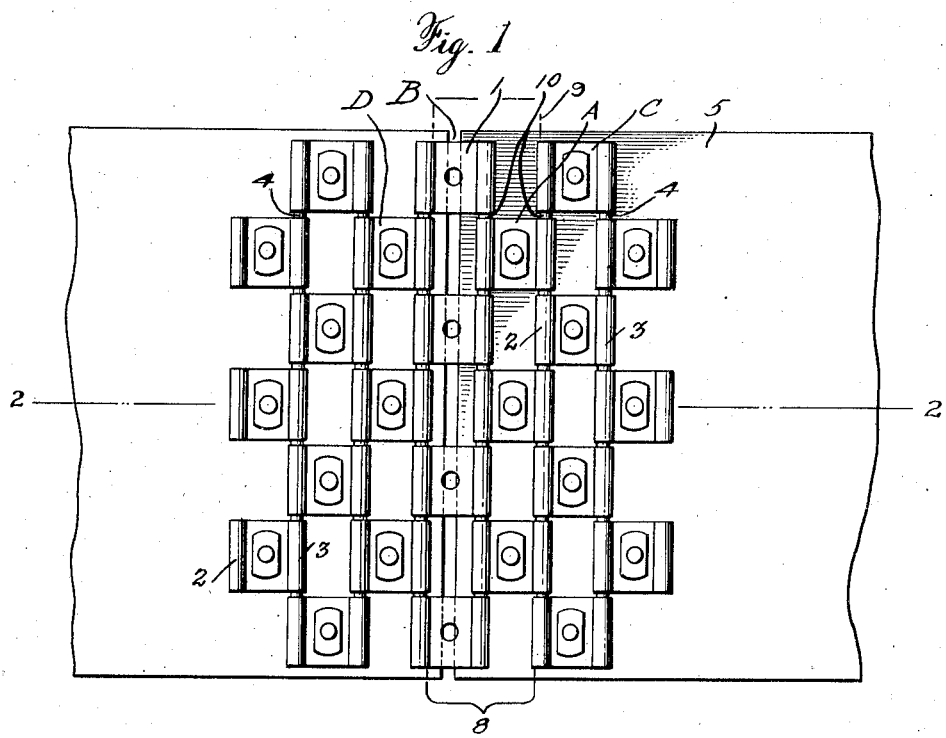
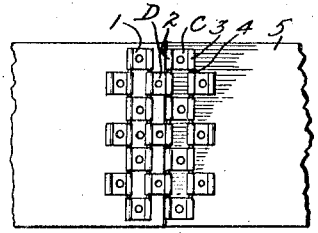
WITNESSES
INVENTOR
JAMES B. McGRORY.
BY
ATTORNEYS

UNITED STATES PATENT OFFICE.

JAMES B. McGRORY, OF NORWICH, CONNECTICUT.

ADJUSTABLE FLEXIBLE BELT-FASTENER.

1,355,766.  Specification of Letters Patent.  Patented Oct. 12, 1920.

Application filed December 19, 1919. Serial No. 346,151.

*To all whom it may concern:*

Be it known that I, JAMES B. McGRORY, a citizen of the United States, and resident of the city of Norwich, in the county of New London and State of Connecticut, have invented a new and Improved Adjustable Flexible Belt-Fastener, of which the following is a full, clear, and exact description.

This invention relates generally to a new and improved belt fastener adapted to be arranged at the ends of a belt, whereby the said ends may be readily connected, and the belt shortened by cutting off the desired lengths leaving a plurality of links secured on the belt and properly placed so that the links will be spaced forming a plurality of rows alternately arranged to permit a pin to pass transversely of the belt through suitable eyelets carried by the links.

It is understood that it is not new to provide a belt fastener construction comprising link members connected to the immediate ends of the belt and having a pin associated therewith which may be moved laterally of the belt through the connectors to connect the ends of the belt, so no claim is here broadly made thereto. In such constructions, the strains are concentrated at the immediate ends of the belt, and when the belt is shortened by cutting the ends, no means is left on the belt which enables the ends of the belt to be immediately connected.

One of the objects of this invention is to provide a belt fastener of simple and compact construction and inexpensive to manufacture having its parts so constructed and arranged that the ends of a belt may readily be connected and the strain will be taken from the immediate ends of the belt and distributed throughout a relatively wide area.

Still a further object of this invention is to provide a belt fastener having its parts so arranged and constructed that a belt may be shortened by cutting off a portion of the end, without at the same time requiring the removal of the entire belt fastener. This will enable the ends to be again immediately connected.

More specifically, an object of this invention is to provide a belt fastener comprising a plurality of rows of spaced link members alternately arranged so that a portion of the links of one row will lie between the spaced links of the adjacent row of links, a means being provided to secure the links to the belt, another means, such as a pin being provided to pass through and connect the alternately arranged links of adjacent rows whereby the links are held in proper relative position, and extend over a relatively wide area whereby the strains are uniformly distributed.

Still a further object of this invention is to provide a belt fastener comprising a plurality of rows of spaced link members extending transversely of the belt, alternate rows being offset so that the links extend within the spaces formed by links in an adjacent row, a suitable means such as a pin, being provided to pass through the overlapping link portions to hold the rows of alternately arranged links in proper relation. The various links are secured in any suitable manner to the belt. Such a construction, will permit a belt to be shortened by cutting a portion of the end together with a row of the links, and the ends of the belt may again be connected by bringing the links remaining on the ends of the belt into proper relation, and passing a transversely movable member through the alined and interfitting link portions.

With the above and other objects in view, the invention has relation to a certain arrangement and combination of parts an example of which is described in the following specification pointed out in the appended claims and illustrated in the accompanying drawings in which similar characters of reference designate corresponding parts in the several views.

Figure 1 is a plan view showing the application of the fastener to the ends of a belt.

Fig. 2 is a sectional view taken on the line 2—2 in Fig. 1.

Fig. 3 is a view showing the position of the belt fastener after a link has been removed from the belt.

Referring more particularly to the drawings, showing for example a practical embodiment of the invention, the fastener comprises a plurality of rows of spaced link members alternately arranged so that the links of adjacent rows overlap, extending into the spaces formed by the links in the next adjacent rows. A suitable member such as a pin extends transversely of the belt and connects the overlapping portions of the links in the adjacent alternately arranged rows. In the form shown, the fastening means is made up of a plurality of links 1 arranged in the manner above stated. Preferably, the links are made of a suitable stamped metal, but it is understood that any suitable material may be used. In the form shown, eyelets or openings 2—3 are formed at each end of the link, the eyelets of the respective links being so arranged that when the links occupy the position shown in Fig. 1, a member such as a pin 4 may be moved transversely of the belt through the alined eyelets in the respective links. The links are secured to a belt 5, in any suitable manner, a rivet 6 and washer 7 preferably being provided. It is to be noted that the head of the rivet is at the under side of the belt, thus affording a construction in which no part of the link fastener proper contacts directly with the driving surface of the belt.

One of the advantages of providing a plurality of rows of spaced links alternately arranged, and providing a means for connecting each link separately to the belt, is that it removes the concentrated strains from the end of the belt and distributes the strains uniformly over a large area. A further important feature in such a construction and arrangement, is that it permits the belt to be shortened, by taking out the desired length of the belt together with a certain number of the links, but leaving at the remaining ends other rows of spaced links which may be arranged in alternate relation and properly connected by passing a pin 4 through the alined eyelets, thus forming in all substantial respects, a connection corresponding to that which existed before the removal of the end portions. A particular advantage of such a construction, is that it permits of hasty repairs without having to stop for a considerable length of time to rearrange the links upon the belt. It is to be understood that any suitable number of rows of spaced links may be used, and that the form of the individual links and the means of securing the same to the belt may be varied.

If for example, it is desired to shorten the belt by removing a length corresponding to that indicated by the bracket 8, the pins on the central row of spaced links would be withdrawn, and the belt would be cut upon the dotted lines 9 removing the first row A of links, together with the central row of links B. It is of course understood that the pin 10 would be withdrawn to permit the row A to be removed. In order to again connect the ends of the belt, the ends would be brought together, and the remaining links would be brought into the position indicated in Fig. 3, in which figure it is to be noted that the first row of links C remaining on the belt would fit in the spaces between the first row of links D on the other end of the belt. A pin of suitable length would then be passed through the alined eyelets of the links.

While only one practical embodiment of the invention has herein been shown, it is to be understood that various changes and modifications falling within the scope of the appended claims may be made without departing from the spirit of this invention.

Having thus described my invention, I claim as new and desire to secure by Letters Patent:

1. In a device of the character described, a means adapted to connect the ends of a belt and to distribute the strains uniformly, the said means including a plurality of rows of spaced independent links alternately arranged, each of said links having eyelets thereon, and means passing through said eyelets connecting the spaced links in the alternately arranged rows.

2. A belt fastener comprising a plurality of rows of spaced links alternately arranged, each of said links having eyelets thereon, the links of one row are so arranged that an eyelet of the independent links of one row will occupy the space between the links of the adjacent alternate row and will register with the eyelet of said links, and a pin adapted to pass through said alined eyelets.

3. A belt fastener adapted to connect the end of the belt, the said fastener comprising a row of spaced independent links arranged adjacent the end of the belt, each of said links having eyelets spaced thereon, means for securing said links to the belt, a second row of spaced independent links having eyelets and alternately arranged with respect to said first named row, whereby the links of the second row fit between the spaced links of this first named row so that the eyelets of the links will be in alinement, a means for securing the links of said second row to the belt, and a pin passing through said eyelets whereby the strain brought upon the connector is uniformly distributed.

4. A belt fastener comprising a plurality of rows of independent alternately arranged spaced links, each of said links having a plurality of eyelets therein, and means passing transversely of the belt connecting the adjacent alternately arranged rows of links.

5. A belt fastener comprising a plurality of transverse rows of spaced independent links arranged adjacent the ends of a belt, other rows of independent links arranged transversely of meeting ends of the belt, the links of each alternate row being staggered with respect to the links of the next adjacent row; a portion of each of the links of the alternate rows extending between the links of the first row, and a means passing through the links of the adjacent rows for holding the said links in proper relative position.

6. A belt fastener comprising a plurality of alternately arranged rows of independent links extending transversely of the meeting ends of a belt, means movable transversely of the belt through the links of adjacent rows to hold the same in proper relative relation, and means for securing the links to the belt.

7. A belt fastener comprising a plurality of rows of independent links extending transversely of a belt, a portion of the links of adjacent rows overlapping to form alined eyelets, a pin passing transversely of the belt through the alined eyelets, and a means connecting each of said links fixedly to the belt, whereby the belt may be shortened by withdrawing a pin, cutting off the desired length of belt together with a row of links, bringing the row of links on the remaining ends into proper relation, and reinserting the pin transversely of the belt.

8. A belt fastener comprising a plurality of independent links having transverse eyelets at their opposite ends, said links being secured in spaced relation to the meeting ends of the belt to constitute spaced rows with the links in one row alternately arranged with respect to the links in the next adjacent row, the ends of the links of one row extending between the ends of the links of the next row to dispose the eyelets thereof in transverse alinement and means adapted to pass through the alined eyelets of adjacent rows for connecting the same.

9. A belt fastener comprising a plurality of members having transversely arranged eyelets in their opposite ends, means for securing the said members in transverse rows in spaced relation on the meeting ends of the belt, members of one row being disposed out of longitudinal alinement with respect to the members of the ends of adjacent rows, the ends of the members of one row lying between the ends of the members of the next adjacent row with the eyelets of the adjacent rows disposed in alinement and connecting means adapted to pass through said alined eyelets for hinging the rows together.

JAMES B. McGRORY.